April 22, 1958   A. H. B. WALKER ET AL   2,832,032
APPARATUS FOR THE REGULATION OF THE VOLTAGE
ACROSS A LOAD CIRCUIT SUPPLIED
Filed March 3, 1954   WITH DIRECT CURRENT   3 Sheets-Sheet 1

INVENTORS
ALEC HERVEY BENNETT WALKER,
RAYMOND GERALD MARTIN,
KENNETH GORDON KING,

BY Robert B Pearson
ATTORNEY

United States Patent Office

2,832,032

APPARATUS FOR THE REGULATION OF THE VOLTAGE ACROSS A LOAD CIRCUIT SUPPLIED WITH DIRECT CURRENT

Alec Hervey Bennett Walker, Raymond G. Martin, and Kenneth G. King, King's Cross, London, England, assignors to Westinghouse Brake and Signal Company Limited, London, England Application March 3, 1954, Serial No. 413,914

Claims priority, application Great Britain March 31, 1953

2 Claims. (Cl. 323—9)

This invention relates to apparatus for the regulation of the voltage across a load circuit supplied with direct current. Apparatus of this character is known which is arranged to maintain the voltage across the load circuit substantially constant over a wide range of values of load current and in some cases it is desirable to protect the apparatus supplying the currrent from damage due to overloading. For example, a rectifier set employed to charge a stand-by battery may be seriously overloaded in the event that, due to a long period of mains failure, the battery should become discharged to a point at which its voltage sinks to an abnormally low value. In order to prevent such overloading the voltage regulating apparatus may be so arranged that it maintains a constant voltage up to a predetermined value of the load current but which thereafter limits the load current to that value. That is to say the characteristic of the apparatus automatically changes from one of constant voltage to one of constant current.

Known apparatus having such a characteristic comprises, in combination, regulating means having positive and negative input terminals and arranged to regulate the voltage in accordance with a direct current potential applied across the input terminals; means for applying across the input terminals a first direct current potential proportional to the voltage to be regulated; means for deriving a second direct current potential proportional to the current supplied to the load circuit; and means for applying the second potential across the input terminals in parallel and in the same sense as the first potential, the means for applying the second potential being connected to the input terminals through a rectifier so poled as to be under reverse voltage stress when the first potential exceeds the second potential.

The object of the invention is to provide apparatus of this known kind in which the rectifier is of the dry contact type and in which the disadvantages arising from the use of such a rectifier are overcome.

According to the invention, apparatus for the regulation of the voltage across a load circuit supplied with direct current comprises, in combination, regulating means having a positive and a negative input terminal and arranged to regulate said voltage in accordance with a unidirectional potential applied to said input terminals, a first source of unidirectional potential supplying a potential proportional to the voltage across said load circuit, a potentiometer connected across said first source and having its negative terminal connected to said negative input terminal, a tapping on said potentiometer connected to said positive input terminal through a first dry contact rectifier, said first dry contact rectifier being so poled as to present its low resistance in the direction from the tapping to the positive input terminal, and a second source of unidirectional potential supplying a potential proportional to the current supplied to the load, the negative terminal of said second source being connected to said negative input terminal and the positive terminal of said second source being connected through a second dry contact rectifier to said first dry contact rectifier on the side thereof adjacent said positive input terminal, said second dry contact rectifier being so poled as to present its low resistance in the direction from said second source to said positive input terminal.

According to another aspect of the invention, apparatus for the regulation of the voltage across a load circuit supplied with direct current comprises regulating means having input terminals and arranged to regulate said voltage in accordance with a direct current potential applied across said input terminals in which there is provided a potentiometer across which is applied the voltage across the load circuit or a voltage proportional thereto, and having its negative terminal connected to the negative input terminal of said regulating means; a tapping on said potentiometer; a first dry contact rectifier connected between said tapping and the positive input terminal of said regulating means and so poled as to present its low resisistance in the direction from the tapping to the terminal; a second dry contact rectifier and third dry contact rectifier connected in series across said first rectifier, each presenting its low resistance in the same direction as said first rectifier; a fourth dry contact rectifier connected to the point of series connection between said second and third rectifiers; means for deriving a direct current potential proportional to the current supplied to the load circuit; and a means for applying the last mentioned potential between said negative input terminal and said fourth rectifier, said fourth rectifier being so poled as to be under reverse voltage stress when the potential between said potentiometer tapping and said negative input terminal exceeds said potential proportional to said current.

When the direct current supplied to the load circuit is obtained from a source of alternating current through a main rectifier, the potential proportional to that direct current may be derived from an alternating current which is proportional to the direct current, the alternating current being rectified by a full wave rectifier and applied across an adjustable resistor, suitable filter means being provided to eliminate or reduce the consequent ripple imposed on the direct current output of the full wave rectifier.

When the direct current supplied to the load circuit is shared by two or more sources of direct current connected in parallel there is a tendency to hunt, that is to say a rapid transfer of load between the sources, when both are operating under load limiting conditions. This hunting may be prevented or reduced by inserting in the connection between the second rectifier and the positive terminal of the means for deriving the direct current potential proportional to the load current a resistor having a tapping, the tappings of the resistors of all the sources being common through associated blocking condensers.

The invention is illustrated by way of example by means of circuit diagrams in the accompanying drawings of which:

Figure 1:
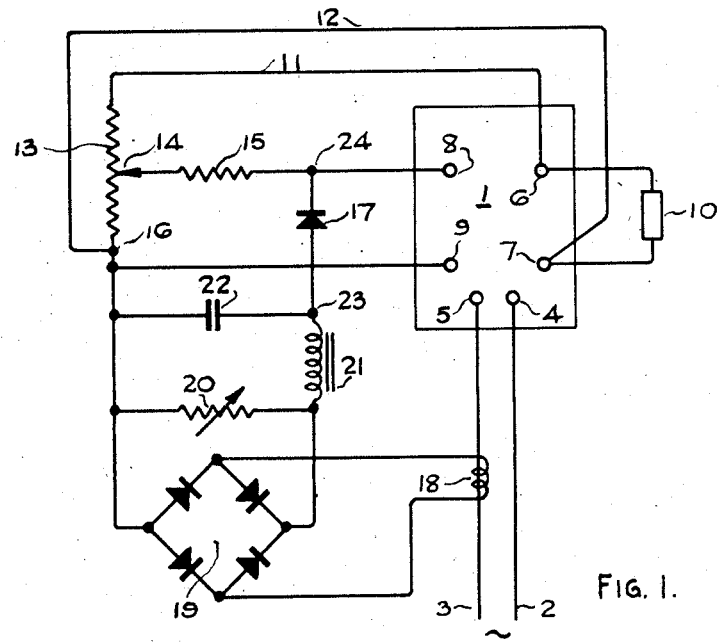
Figure 1 illustrates one circuit arrangement to which the invention may be applied.

Considering first Figure 1, reference numeral 1 indicates apparatus of known type for supplying direct current to a load circuit 10 connected to positive and negative output terminals 6, 7 respectively from an alternating current source, not shown, connected through supply conductors 2, 3 to supply terminals 4, 5. This apparatus 1 comprises voltage regulating means which regulate the direct current voltage across output terminals 6, 7 in accordance with the direct current potential applied across positive and negative input terminals 8, 9 in such manner that an increase in the potential across terminals 8, 9 results in a corresponding decrease in the voltage across output terminals 6, 7.

Output terminals 6, 7 are connected by wires 11, 12 respectively to the ends of a potentiometer 13 having a tapping 14. Tapping 14 is connected through a resistor 15 to the positive input terminal 8 of the voltage regulating means, whilst the negative end 16 of the potentiometer 13 is connected to the negative input terminal 9. It will thus be seen that the apparatus so far described provides a direct current potential proportional to the voltage across the load circuit 10 across the input terminals 8, 9 so that the apparatus 1 will function to maintain the voltage across the output terminals 6, 7 substantially constant, that is to say it has a constant voltage characteristic.

Connected in the alternating current supply conductor 3 is a current transformer 18 which provides an alternating current potential across a bridge connected rectifier 19, which produces a corresponding rectified potential across the adjustable resistor 20. The negative end of resistor 20 is connected to the negative end 16 of the potentiometer 13, and thus to the negative input terminal 9, whilst its positive end is connected to the rectifier 17. A filter comprising inductance 21 and condenser 22 is provided to reduce the ripple voltage superimposed upon the direct current voltage of the rectifier 19.

The rectifier 17, which may be a diode valve, is so poled that when point 24 is at a higher potential relative to point 16 than is point 23 the rectifier is under reverse voltage stress, and so long as this state of affairs persists the apparatus 1 functions to maintain the voltage across the load circuit 10 substantially constant. If now the load current increases, the current in supply conductors 2, 3 will increase correspondingly and increase the potential across resistor 20 in proportion. If this latter potential exceeds that between points 14 and 16, this higher potential will be applied across input terminals 8, 9 and the apparatus 1 will function to reduce the voltage across output terminals 6, 7 to arrest the increase in load current. The apparatus is then controlled by the potential proportional to the current, that is to say that it has a constant current characteristic.

It will thus be seen that if the resistor 20 is adjusted so that when the maximum permissible current is being supplied to the load circuit the direct current potential between points 23 and 16 is equal to that appearing between points 14 and 16 when the voltage across the load circuit is at its regulated value, then any increase in load current above this maximum permissible value automatically results in a change-over to constant current control and further increases in current are prevented by a reduction in the voltage across the load circuit.

The function of the resistor 15 is to enable a higher potential than that of point 14 to be developed at point 24. If, however, rectifier 17 is a so-called metal rectifier, such as a selenium rectifier, certain difficulties arise due to the fact that both reverse and forward resistances of such rectifiers have finite values and they are accordingly neither perfect insulators in the reverse direction of current flow nor perfect conductors in the forward direction of current flow. In consequence, when the potential of point 24 exceeds that of point 23, as it will do under normal load conditions, there will be a certain reverse leakage current, that is to say current flowing in the reverse direction, through rectifier 17 which current, traversing resistor 15, produces a potential drop across this resistance so that the potential of input terminal 8 is lower than that of point 14 by a value which will vary with variations in the potential across resistor 20 and thus with variations of the load current. It will thus be seen that the voltage across the load circuit will no longer be maintained constant for all values of load current over the desired range. In order to minimise this variation of potential across input terminals 8, 9 the resistance of resistor 15 is required to be as low as possible.

Under constant current conditions, however, when the potential of point 24 is above that of point 14, it is desirable that the potentials of points 23 and 24 should be equal. But, owing to the forward resistance of rectifier 17, any forward current traversing this rectifier will result in a potential drop across it, thus lowering the potential of point 24 in relation to that of point 23. To minimise this potential drop it is necessary to minimise the forward current and for this the resistance of the resistor 15 is required to be as high as possible.

Figure 2:
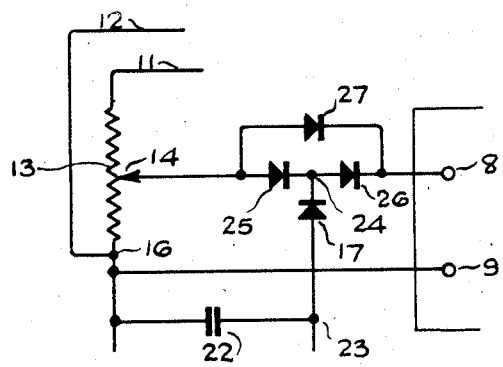
Figure 2 illustrates a modification, according to the invention, of a portion of Figure 1 designed to overcome certain undesirable features which may arise when the rectifier shown in Figure 1 is a so-called metal rectifier.

There are thus two incompatible requirements for the resistor 15 and Figure 2 illustrates one method, according to the invention, of overcoming this difficulty. In this arrangement resistor 15 is replaced by a dry contact rectifier 25. Under the constant voltage conditions described above the reverse current traversing dry contact rectifier 17 traverses rectifier 25 in its forward direction, in which direction rectifier 25 presents a low resistance, whilst under constant current conditions the forward current traversing rectifier 17 traverses rectifier 25 in its reverse direction, in which direction that rectifier presents a high resistance. Thus the two above mentioned requirements, incompatible in the case of resistor 15 of Figure 1, are both satisfied.

The arrangement so far described in relation to Figure 2 and including only the rectifiers 17 and 25 operates satisfactorily for many purposes, but as a further improvement, and in order that the positive input terminal 8 shall be maintained at the same potential as point 14 under constant voltage conditions in spite of the drop in potential across rectifier 25 caused by the flow through that rectifier of the reverse current of rectifier 17, a dry contact rectifier 27 is connected between point 14 and terminal 8 so poled as to present its low resistance in the direction from the point 14 to the terminal 8 as shown, a further dry contact rectifier 26 being provided as shown to prevent the aforesaid reverse current traversing rectifier 17 also traversing rectifier 27.

In the absence of rectifiers 26 and 27 the potential of input terminal 8 is equal to that of the junction point 24 and the potential of the point 24 is determined by the two rectifiers 17 and 25 connected in series opposition between the point 23 and the slider 14. These two rectifiers together act as a potential divider and, since they both have a significant forward resistance, the potential of the point 8 is never equal to that of the slider 14 or to that of the point 23. This disadvantage is reduced to negligible proportions by connecting the rectifiers 26 and 27 in series opposition across the rectifier 25 and connecting the terminal 8 to the common point between them. The rectifiers 26 and 27 then act as a potential divider across the rectifier 25 and since the forward resistance of rectifier 27 is very much less than the reverse resistance of rectifier 26 they have the effect of bringing the point 8 very much nearer the potential of the slider 14 than the simpler arrangement.

Figure 3:
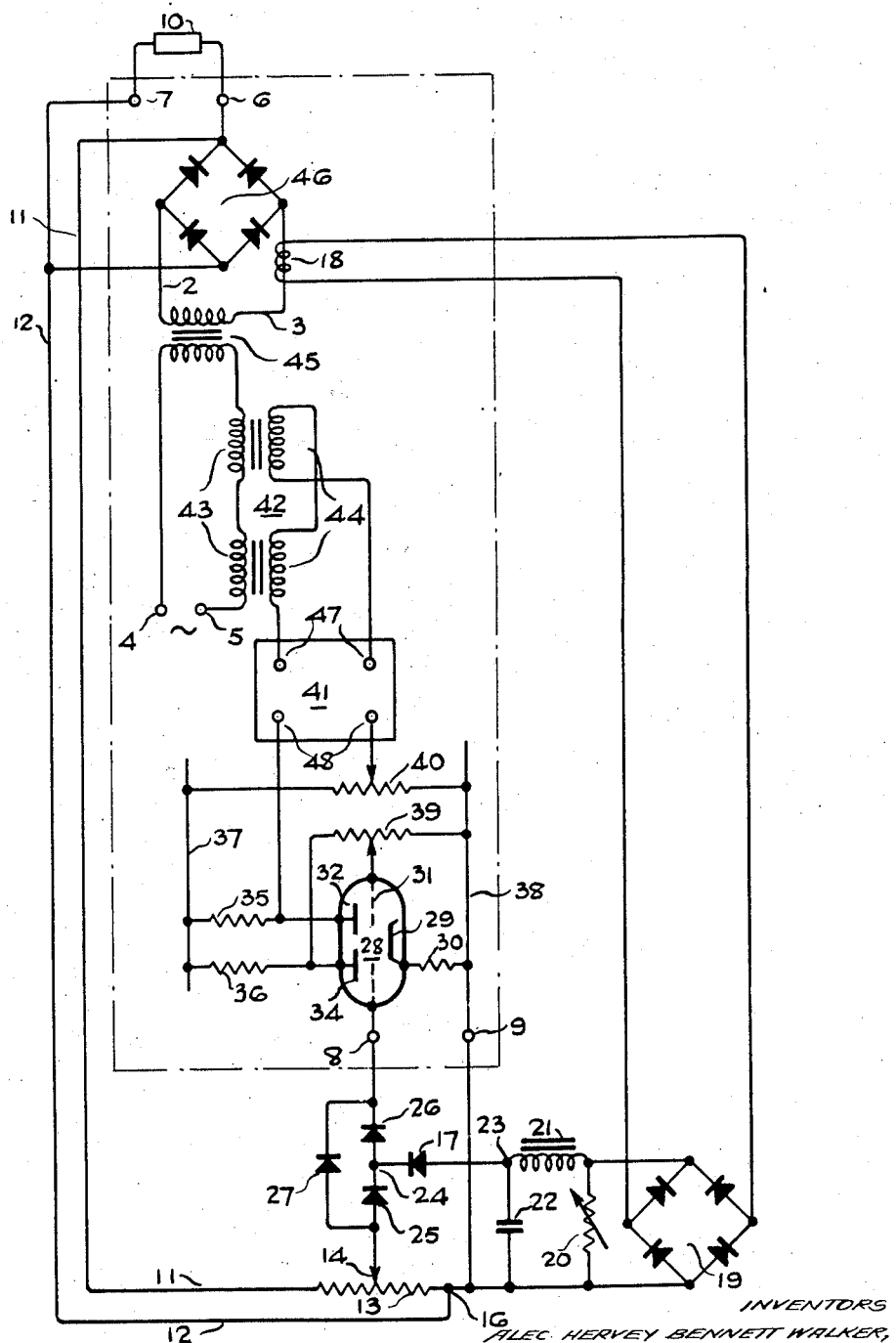
Figure 3 illustrates one way in which apparatus embodying the invention may be applied to one form of voltage regulating means.

Referring now to Figure 3, there is here illustrated an embodiment of the invention in the form described above with reference to Figure 2 applied to the voltage regulating means of a kind utilising a double triode electronic valve having two anodes and a common cathode providing two anode circuits each with a control grid to which a direct current potential is applied to control the flow of current in the anode circuits in well known manner, the variations of anode current being utilised to bring about the desired voltage regulation. A rectifier 46 is arranged to supply direct current to a load circuit 10 connected across output terminals 6, 7. Rectifier 46 is energised from a source of alternating current (not shown) connected to supply terminals 4, 5 through a transformer 45 and supply conductors 2, 3. Connected in series with the primary winding of transformer 45 is a saturable reactor device 42 of any suitable form having direct current control windings 44 upon the magnitude of the current in which depends the alternating current impedance of impedance windings 43 and thus the direct current voltage applied to the load circuit across output terminals 6, 7. The control windings 44 are supplied with direct current from the output terminals 47 of an amplifier 41 of any suitable type such as, for example, a thyratron push-pull amplifier.

Connected across high tension conductors 37, 38 which are maintained at a substantially constant potential by means not shown, is a double triode electronic valve device 28 having a first anode 32, a first control grid 31, a second anode 34, a second control grid 33 and a common cathode 29. First and second anodes 32 and 34 are connected to the positive high tension conductor 37 through anode resistors 35 and 36 respectively, while cathode 29 is connected to the negative conductor 38 through a cathode resistor 30. Negative conductor 38 is connected to negative input terminal 9. Between the negative end of anode resistor 36 and conductor 38 is connected a potentiometer 39, to an intermediate point on which is connected the first control grid 31. Thus, with no current flowing in the anode circuit of the second anode 34, a predetermined potential, dependent upon the setting of potentiometer 39 and the resistance of anode resistor 36, is applied to the first control grid 31. The second control grid 33 is connected to the positive input terminal 8. Also connected across conductors 37, 38 is a potentiometer 40, the input terminals 48 of the amplifier 41 being connected between an intermediate point of this potentiometer and the negative end of anode resistor 35. Connected to input terminals 8, 9 is the apparatus hereinbefore described for producing across those terminals a direct current potential the magnitude of which depends upon the voltage across the load circuit or the current flowing therein as described with reference to Figure 1 as modified according to Figure 2.

The resistance of the anode resistors 35, 36 and the characteristic of the valve device 28 are so chosen that the sum of the currents flowing in the two anode circuits is maintained substantially constant and the potentiometer 13 is so adjusted that when the voltage across the load circuit is at the desired value the potential across terminals 8, 9 is such that the potentials of the two control grids are equal and the current passed by the valve device is shared equally by the two anode circuits. With the apparatus so adjusted, an increase in the voltage across the output terminals 6, 7 results in a corresponding increase in potential between points 14 and 16 of potentiometer 13 and thus between input terminals 8, 9. This rise in potential of control grid 33 causes an increase in current in the circuit of anode 34 and a corresponding decrease in current in the circuit of anode 32. In consequence of this reduction of current passed by anode 32, the potential drop across anode resistor 35 decreases, resulting in an increase in potential between terminals 48 of amplifier 41 which, in turn, reduces the current supplied by the amplifier to the control windings 44 of the saturable reactor device 42 and thus lowers the alternating current voltage applied to rectifier 46 to correct the increase in direct current voltage which occurred across output terminals 6, 7.

Current transformer 18 applied an alternating current potential across rectifier 19 proportional to the alternating current flowing in supply conductor 3, and thus proportional to the direct current flowing in the load circuit, and rectifier 19 produces a corresponding direct current potential across adjustable resistor 20. As previously explained, the resistor 20 is so adjusted that with the maximum permissible current flowing in the load circuit the potential between points 23 and 16 is equal to that between point 14 and point 16 with the normal output voltage across the load circuit 10. Assuming now that the resistance of the load circuit 10 decreases to such a value that the current in this circuit rises above the maximum permissible value, the potential across resistor 20, and thus between points 16 and 24, will be increased, increasing the potential of control grid 35 with the result that the current passed by anode 34 increases while that passed by anode 32 decreases, so that the input to amplifier 41 is increased and the current supplied to the control windings 44 of saturable reactor 42 is decreased accordingly. This, as explained above, causes a reduction in the direct current voltage applied to the load circuit, thus reducing the current flowing therein. This decrease in load current is reflected in a corresponding decrease in potential across resistor 20 and the system is stabilised at the maximum value of load current until such time as the resistance of the load circuit returns to such a value that the current taken thereby at normal output voltage is below the maximum permissible value, whereupon the system again provides a constant output voltage.

Figure 4:
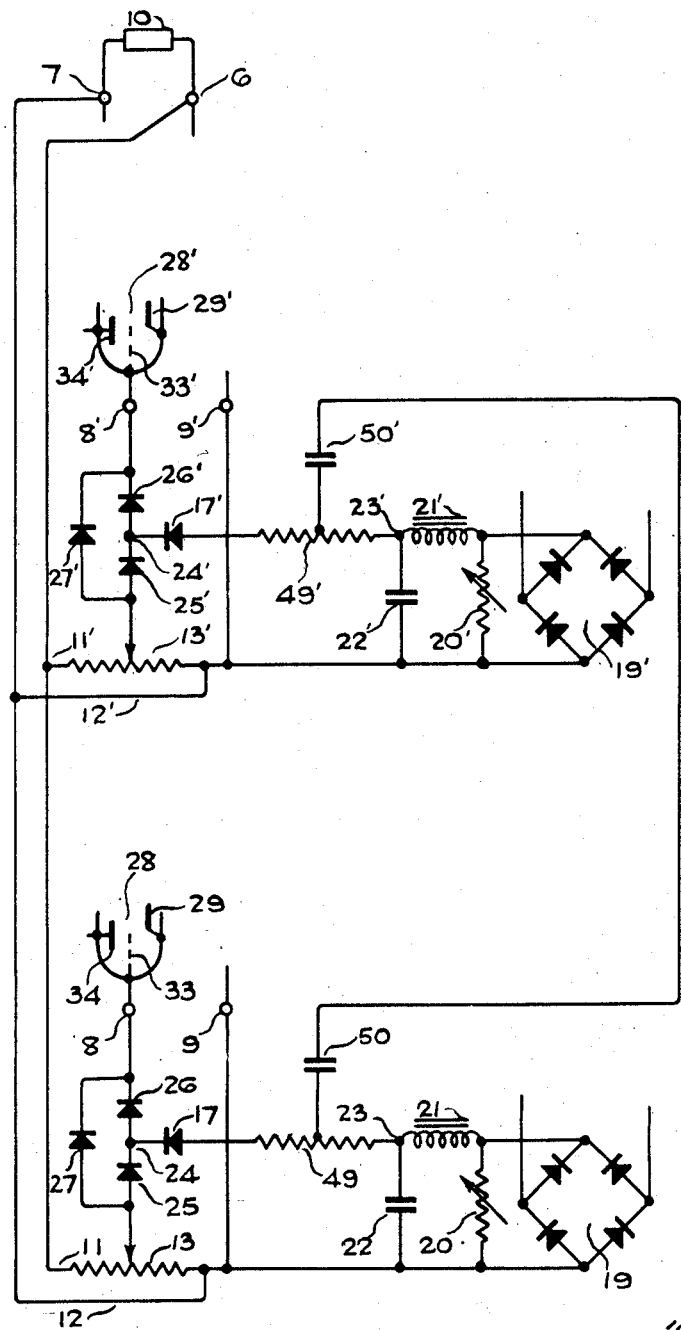
Figure 4 illustrates means for reducing or preventing hunting when the load is shared by two parallel connected sets of apparatus as shown in Figure 3.

When a common load circuit is supplied from two or more sets of apparatus such as that illustrated in Figure 4 connected in parallel it is found that "hunting" in the form of rapid transfers of load current between the sets when working under load limiting, i. e. constant current, conditions, is liable to occur. A means of preventing this undesirable feature is illustrated in Figure 4 wherein the relative portions of two identical sets of apparatus as shown in Figure 3 are shown. In this figure it is assumed that the rectifiers 46 (not shown in Figure 4) of each set are connected in parallel across output terminals 6, 7 to which is connected the common load circuit 10.

The anti-hunting means comprises, in each set, a resistor 49, 49′ and a condenser 50, 50′. The resistor is inserted in the connection between point 23 and rectifier 17 and the condenser is connected between the mid-point of its associated resistor 49, 49′ and a common conductor 51. It is evident that, if only two sets are employed, the two condensers may be substituted by a single condenser. The resistance of the resistor 49, 49′ should be such that, when the sets are controlled by the load current (constant current characteristic) the potential drop across this resistor is not great enough to increase the potential difference between points 23 and 24 to a serious extent.

Having thus described our invention, what we claim is:

1. Apparatus for the regulation of the voltage across a load circuit supplied with direct current comprising, in combination, regulating means having positive and negative input terminals and arranged to regulate said voltage in accordance with a direct current potential applied across said input terminals; a potentiometer; means for applying across said potentiometer a first direct current potential proportional to the voltage across the load circuit; a connection between the negative end of said potentiometer and said negative input terminal of said regulating means; a tapping on said potentiometer; a first dry contact rectifier connected between said tapping and said positive input terminal of said regulating means and so poled as to present its low resistance in the direction from the tapping to the input terminal; a second dry contact rectifier and a third dry contact rectifier connected in series across said first rectifier, each presenting its low resistance in the same direction as said first rectifier; a fourth dry contact rectifier connected to the point of series connection between said second and third rectifiers, means for deriving a second direct current potential, proportional to the current supplied to the load circuit; and means for applying said second direct current potential, between said negative input terminal and said fourth rectifier, said fourth rectifier being so poled as to be under reverse voltage stress when the potential between said potentiometer tapping and said negative input terminal exceeds said second direct current potential.

2. Apparatus for the regulation of the voltage across a load circuit supplied with direct current, as claimed in claim 1 for each of two or more sources supplying, in parallel, direct current to a common load circuit, and comprising, in combination, a resistor connected between said fourth rectifier and said means for deriving said second direct current potential; a tapping point on each of said resistors; and a common conductor to which each of said resistor tapping points is connected through a condenser.

References Cited in the file of this patent

UNITED STATES PATENTS

| | | |
|---|---|---|
| 2,019,352 | Livingston | Oct. 29, 1935 |
| 2,079,500 | Foos | May 4, 1937 |
| 2,306,998 | Claesson | Dec. 29, 1942 |
| 2,563,486 | Potter | Aug. 7, 1951 |